Jan. 16, 1968
W. D. DRUMMOND
3,363,407
HARVESTER PLATFORM WITH LATERAL FLOAT AND ATTITUDE CONTROL MEANS
Filed April 28, 1965
3 Sheets-Sheet 1
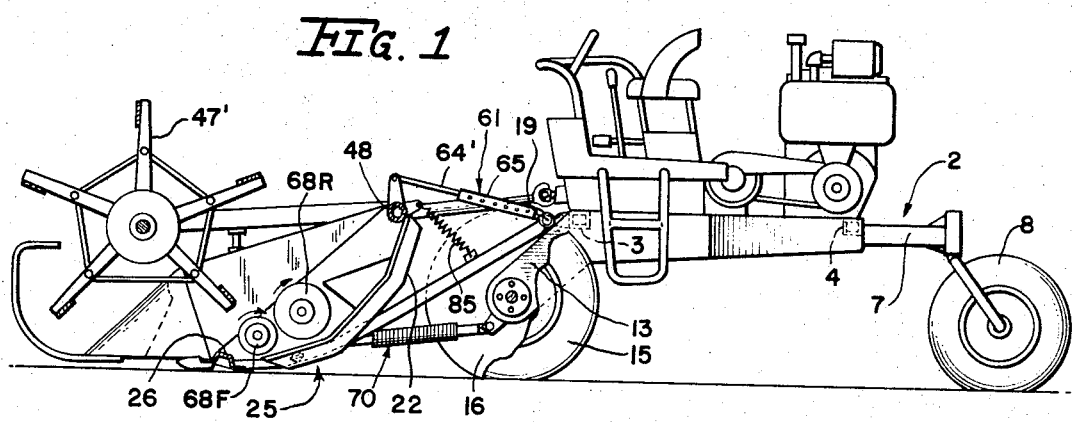
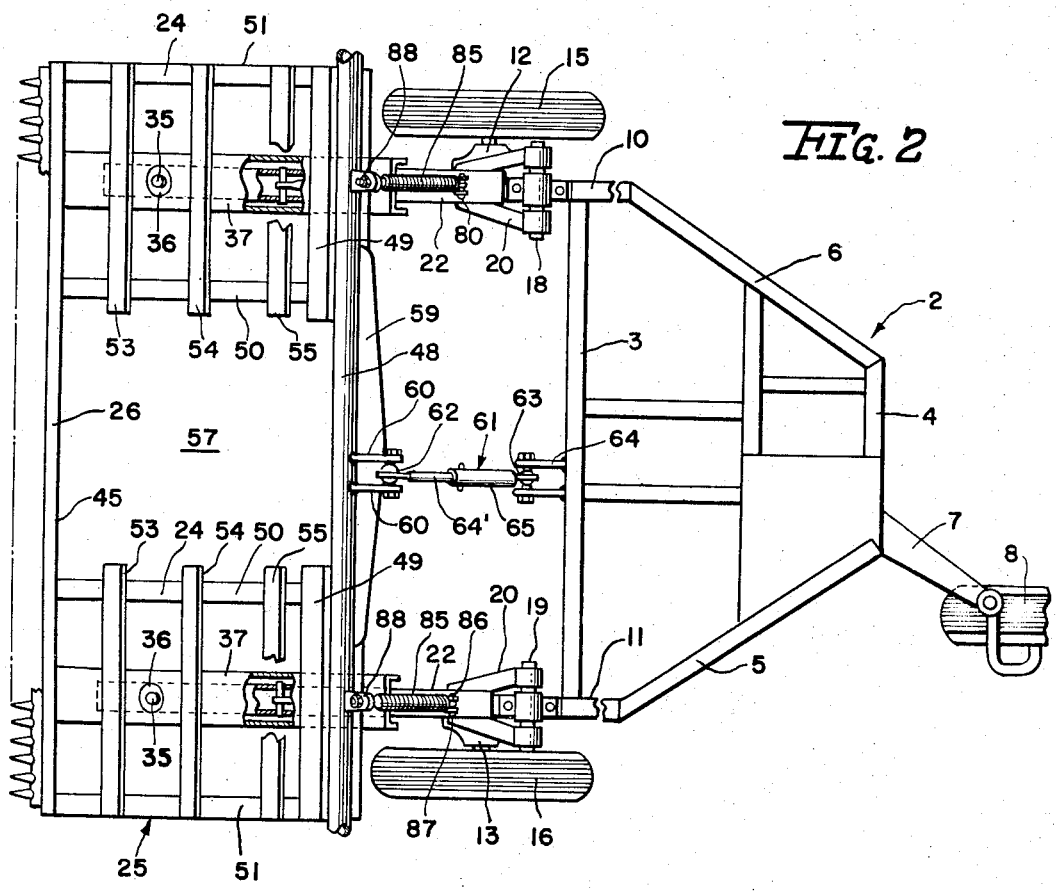
INVENTOR.
William D. Drummond
John J. Kowacis
Attorney

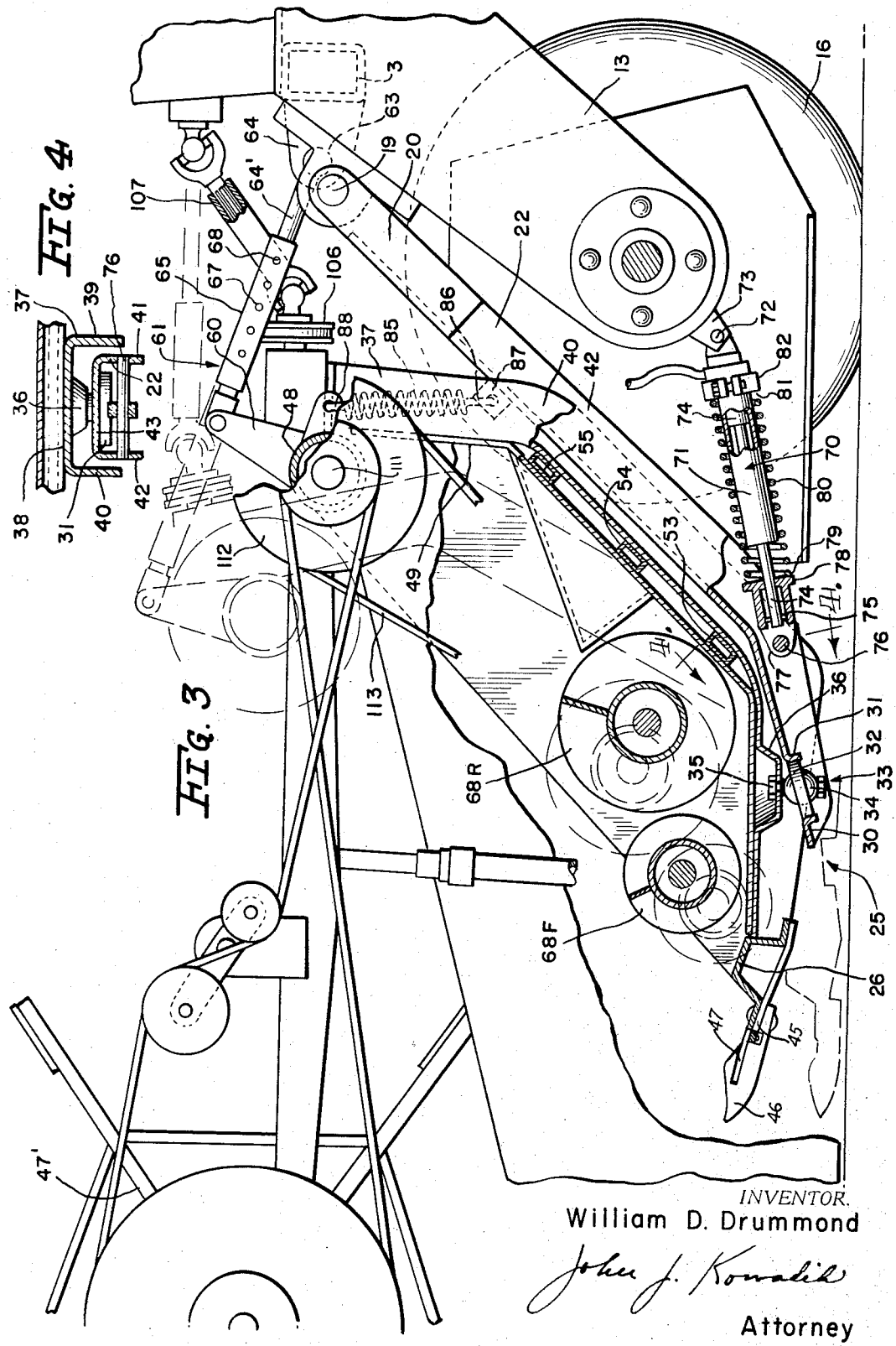

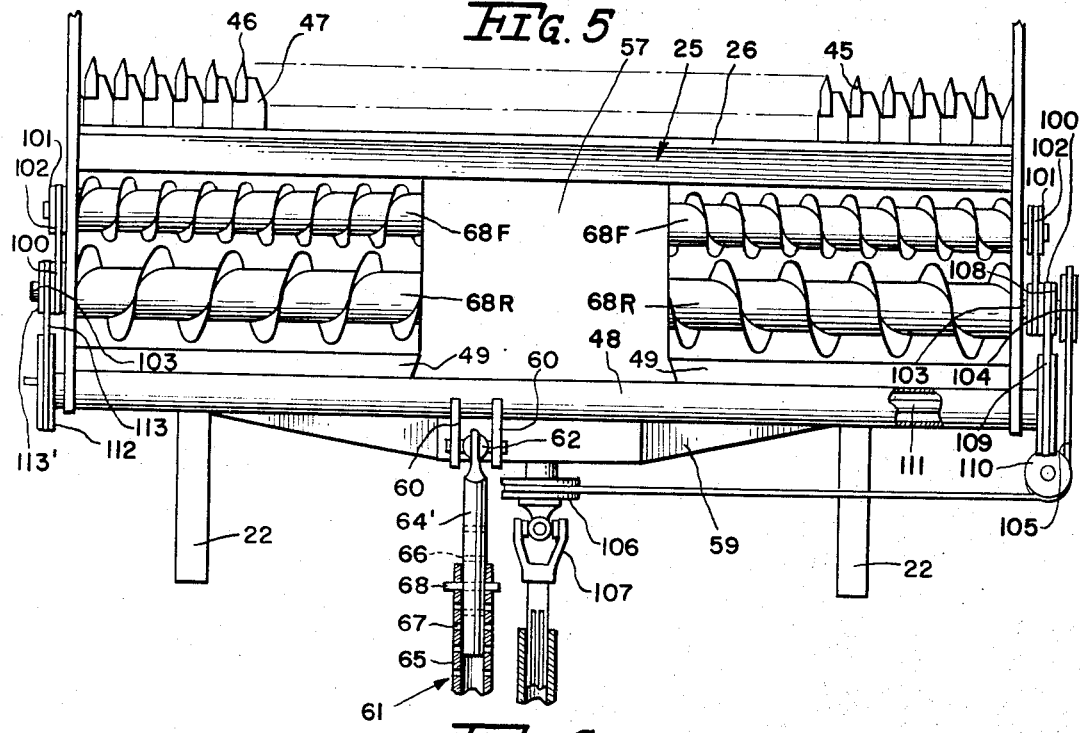
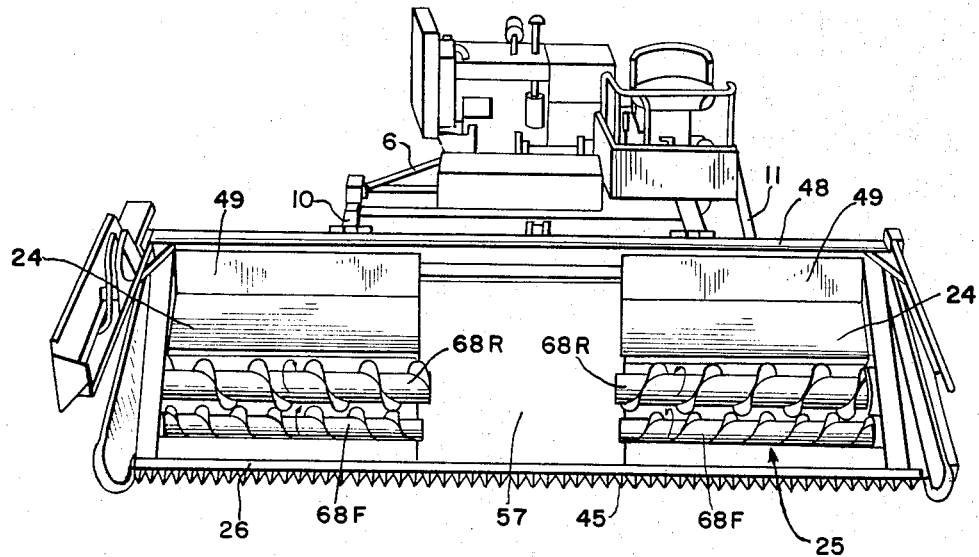

United States Patent Office 3,363,407
Patented Jan. 16, 1968

3,363,407
HARVESTER PLATFORM WITH LATERAL FLOAT
AND ATTITUDE CONTROL MEANS
William D. Drummond, Burlington, Ontario, Canada, assignor to International Harvester Company, Chicago, Ill., a corporation of Delaware
Filed Apr. 28, 1965, Ser. No. 451,390
11 Claims. (Cl. 56—23)

ABSTRACT OF THE DISCLOSURE

A harvester having a platform pivot structure mounting the platform on a first generally horizontal axis, a pivot structure mounting the platform on a second generally horizontal axis spaced from the first axis and a conveyor on the platform, and adjusting linkage for tilting the platform about the second axis to change the position of the mower at the front of the platform as well as the delivery position of the conveyor to vary the attitude of the swath as it is windrowed.

---

This invention relates to harvesting machines and, more specifically, to a novel platform structure which is adapted to float universally to follow varying land contours and in which the platform is positionable at different angles to the ground.

Windrowing machines are used for cutting and windrowing various crops. Grain crops require a windrow wherein first the butt ends are deposited upon the ground and the heads fall last and are on top of the windrow where they can dry in the air and sun. In harvesting hay, particularly where no crusher is used, the heads or leafy portions of the plants should be buried in the windrow and the butt ends should be up so as to obtain a drying rate of the stems commensurate with that of the leaves to prevent the leaves from drying to a point where they crumble off leaving only a stalky plant.

This invention is an improvement over the structure shown and claimed in U.S. application, Ser. No. 418,942, filed Nov. 24, 1964, for Double Auger Platform Windrower, now abandoned.

A general object of the invention is to provide a novel platform mounting for a harvester in which the platform is supported to tilt laterally as well as fore and aft.

The invention comprehends the provision of novel linkage for mounting a harvester platform from a supporting structure, wherein the linkage includes mechanism for raising and lowering the platform and adjusting its angular relation to the ground.

A more specific object of the invention is to provide novel mounting for the linkage with the platform by means of ball connections, the linkage comprising a pair of actuating rams connected between an associated carrier and the platform adjacent the opposite ends thereof and an intervening third point link at an elevation above the rams.

A further object of the invention is to provide a novel mounting linkage for a harvesting platform from an associated carrier, wherein the linkage comprises rams connected between opposite ends of the platform and the carrier, the arms having connections with the platform through means acted on by spring means which react between the carrier and the frame of the harvester platform, the spring means serving to yieldably support the platform in conjunction with an adjustable third point link which extends from the platform substantially midway between the hydraulic rams and the carrier, the rams in the lowered position of the platform being exhausted of fluid and thus in no way inhibiting the action of the springs which serve as the primary support for the platform.

These and other objects and advantages inherent and encompassed in the invention will become more apparent from the specification and the drawings, wherein:

FIGURE 1 is a side-elevational view of a windrower incorporating the invention shown partially in longitudinal section;

FIGURE 2 is a skeletal plan view with parts removed and in section;

FIGURE 3 is an enlarged sectional view of the platform; and

FIGURE 4 is an enlarged sectional view taken on line 4—4 of FIGURE 3.

FIGURE 5 is an enlarged plan view of the platform;

FIGURE 6 is a front perspective view of the windrower incorporating the invention.

Describing the invention in detail and having particular reference to the drawings, there is shown a carrier generally designated 2, which in the present instance of the conventional type and comprises a somewhat trapezoidal framework including front and rear transverse members 3 and 4 and intervening side members 5 and 6. The frame members 4 and 5 incorporate a box section structure at their juncture which mounts a rearwardly extending beam member 7 to which is mounted a tail wheel 8.

The members 5 and 6 have fore-end-aft forward extensions 10 and 11 with drop axle housings 12 and 13 which mount the forward or drive wheels 15 and 16.

The forward extensions 10 and 11 are provided with coaxial transversely extending stub-axles 18 and 19 which pivotally mount the rear extremities 20 of downwardly and forwardly extending platform support arms 22.

Each arm 22 extends under the associated end portion 24 of a harvesting platform generally designated 25 to adjacent the forward edge 26 of the platform. The forward end 30 of each arm 22 is provided with a socket 31 which receives the outer race 32 of a ball joint connection generally designated 33. Said connection in addition to the socket 32 including a ball 34 which fits into the race 31 and has universal angling movement with respect thereto. The ball 34 is connected by means of a nut and bolt 35 to a depressed embossment 36 on the forward end of the fore-and-aft extending frame member 37 of inverted channel construction which has a top web 38 and a pair of laterally spaced depending side webs 39 and 40 which loosely embrace the member 22 and cooperate with the side webs 41 and 42 thereof to limit the lateral angling movement of the platform frame with respect to the support arms. It will be noted that the web 38 is spaced vertically from the top web 43 of the associated arm 22, said arm 22 being also of inverted channel shape whereby the platform is accommodated rocking movement on a transverse axis with respect to the arms 22.

The platform structure includes a front cutter bar slab 45 which is provided forwardly projecting guards 46 on which reciprocates an associated sickle 47. The member 45 forms the front of the platform sweep by an overhanging reel 47', the rear of the platform is formed by an elevated transverse member 48 which is connected by vertical panel walls 49, 49 to the sub-frame structure constituting the end portions 24 and 25, each of which includes inboard and outboard fore-and-aft extending members 50 and 51 as well as the associated beam 37 which is disposed intermediately of the members 50 and 51. Beams 37, 50 and 51 are connected at their forward ends to the bar 45. A plurality of transverse brace members 53, 54, and 55 are provided interconnecting the members 37, 50 and 51. It will be seen that the panels 49 connect with the rear ends of the members 37, 50 and 51 and that the element 48 is spaced a considerable distance above the plane of the platform as defined in part by subframe structures so as to allow the crops to pass there-under as they are discharged from opposite ends of the platform into a central windrow opening 57.

The central portion of the member 48 is formed with a strengthening gusset plate structure 59 which is provided with a pair of rearwardly extending ears 60 between which projects the forward end of an upper link generally designated 61 connected as by ball joint 62 thereto, the link 61 having its rear end connected by a ball joint 63 to the ears 64 which are connected to the front transverse beam members 3 of the carrier substantially medially thereof.

The link 61 has a pair of front and rear telescoping parts 64', 65, the inner part 64' having a series of transverse openings 66 spaced lengthwise of the link and alignable with similar transverse openings 67 in the tubular outer rear part 65, selected openings 66, 67 receiving a pin 68 therethrough. The adjustment of the link 61 determines the inclination of the platform to the ground and the position of the guards 46 and also of the transverse open ended auger conveyors 68F and 68R.

The entire platform is actuated to raised and lowered positions by means of the rams generally designated 70 each of which comprises a cylinder portion 71 which is pivotally connected as at 72 to an ear 73 mounted on the associated pedestal 10 or 11. A piston stem 74 operates within the cylinder and is connected by casting 75 to the side walls 41 and 41 of the associated member 22 intermediate its ends as by transverse pin 76 which passes through ears 77 which are formed on the casting sleeve. It will be noted that the piston stem 74 is slidable lengthwise within the sleeve 75 and abuts against the pin 76 against which it reacts in raising the platform. The sleeve 75 has an enlarged annular portion 78 at its rear end which affords a seat as at 79 for one end of a compressing spring 80 which at its other end seats as at 81 against an abutment 82 which is adjustably clamped or secured to the cylinder 71. It will be observed that the clamp or the adjustable abutment 82 is movable lengthwise on the cylinder and therefore determines the loading on the spring 80 which serves to support the platform floatingly upon the cylinder being deactivated wherein the platform is in the lowered and operating position. Inasmuch as the platform is somewhat overbalanced forwardly of the connections at 35 a counter-balancing spring 85 is provided above each arm 22 and has its lower end 86 connected at at 87 to an ear on the associated arm 22 intermediate its ends and has its upper end connected as at 88 to a rearwardly extending ear on the crossmember 48 of the platform.

It will be readily noted that upon actuation of the operating rams 70, the platform will be raised to different operating positions or to an inoperating position. In order to utilize the floating feature, the rams are de-energized or collapsed and the platform then rides or is sustained in it operating position by means of the springs 80. It will be readily appreciated that when the platform tilts laterally or upwardly the appropriate movement is accommodated by the ball joints 35 as well as by the action of the elements 75 which slide on the stem 74 of the associated ram. The position of the platform is determined, of course, by the setting of the springs 80 and this is accomplished by positioning the seating structure 82 along the length of the ram. The counter-balance of the springs 85 obtains a distribution of the platform weight in such manner that it very readily tends to float upon the cutter bar guard fingers 46 meeting any obstruction.

It will be observed that the auger 68F is smaller and in front of auger 68R which is larger. The relative sizes of these augers and their specific mounting is particularly described in the aforementioned companion application. Suffice it to say that in the instant case upon platform being tilted upwardly at its forward edge about the joints 33 the rear of the platform is lowered. Under such conditions as for harvesting hay, the guards 46 are directed upwardly thus permitting the platform to slide over hills, etc. and at the same time lowering the rear auger 68R which is behind the transverse axis of pivot of joints 33 and elevating the front auger 68F. Thus, the head ends of the plants which fall upon the rear auger descend head first into the stubble because of the direction of rotation of the augers as shown in the drawings by the arrows and the relative speed of discharge because of difference in size of the augers and the faster speed of the rear auger.

The reverse situation prevails in harvesting grain in that since the platform is normally elevated into toto, the front end of the platform at the guards is either horizontal or directed downwardly. The rear augers are raised substantially above the front augers and thus the fall of the cut plants is such that the butt ends of the plants fall into the stubble first with the head ends up. If required, the relative speeds of the augers may be such that the smaller augers have a faster delivery rate than the augers. This is accomplised by varying the sizes of the driving pulleys 100, 101 which may be driven by belt 102. The shaft 103 of auger 68R may be connected to pulley 104 which may be driven by belt 105 from the pulley 106 which is driven from the universal joint power take off shaft 107. The pair of augers 68F, 68R at the opposite side of the platform may be driven by pulley 108 on shaft 103 driving belt 109 which drives pulleys 110 on shaft 111 which is journaled through member 48. Shaft 111 may have a pulley 112 which through belt 113 drives pulley 113' on shaft 103 of the auger 68R on the right (FIGURE 5) and the augers 68F and 68R are interconnected by belt and pulleys as on the left side (FIGURE 5).

I claim:

1. A swather comprising a frame structure having axially spaced supporting wheels journalled on a common fixed axis, a windrower including a rigid generally rectangular windrower frame, a normally horizontally disposed mower elongated in a direction transversely of the direction of travel of said frame structure and mounted on the forward edge of said windrower frame, a conveyor disposed rearwardly of and generally parallel to said mower for receiving cut material from said mower and delivering material in a direction longitudinally of the mower and depositing said material on the ground in a windrow, said frame extending rearwardly from said mower and including a pair of generally parallel augers disposed in closely spaced relation in close proximity to the mower and rotatable on force and aft spaced axes generally parallel thereto, a pair of mounting arms pivotally connected at one end to said windrower frame on a common axis extending longitudinally of said frame and near the forward edge of said frame, the other ends of said arms being pivotally connected to said frame structure on a common horizontal axis normally generally parallel to the pivot axis of said one end thereof in an area intermediate the axes of said pair of augers, said arms being disposed adjacent opposite end portions of said windrower frame, a longitudinally adjustable link having a universal connection at one end to said frame structure and a second universal connection at its other end to the upper rear edge portion of said windrower frame generally centrally of the opposite ends of said windrower frame, whereby each end portion of said windrower is movable in a generally vertical direction independently of the opposite end thereof and relative to the axis of said wheels, counterbalancing means carried by said frame structure and operatively connected to said windrower for floatingly supporting said windrower and said frame structure for bodily raising and lowering said windrower relative to said wheels while permitting said independent generally vertical movements of the opposite end portions of said windrower.

2. A swather comprising a frame structure having axially spaced supporting wheels journalled on a common fixed axis, a windrower including a normally horizontally disposed mower elongated in a direction transversely of the direction of travel of said frame structure and a conveyor disposed rearwardly of said mower and generally parallel thereto for receiving cut material from said mower and depositing said material on the stubble in a windrow, means mounting said windrower on said frame structure for generally vertical movements of each end portion of said windrower independently of the other end portion thereof and relative to the axis of said wheels, said means comprising a pair of laterally spaced rigid arms pivotally connected at their opposite ends to said frame structure and to spaced points on said windrower toward the forward portion thereof, said rigid arms comprising front and rear sections connected together for relative movement about the longitudinal axis of their respective arm, said means further including adjustable linkage pivotally connected to said frame structure and to the rear portion of said windrower for tilting the platform about the axis of pivot of the arms thereto, a pair of counterbalancing elements carried by said frame structure and operatively connected to longitudinally spaced points on said windrower for floatingly suspending said windrower and means operatively connected to said windrower and said frame structure for bodily raising and lowering said windrower relative to said wheels while permitting said independent generally vertical movements of the opposite end portions of said windrower, and said conveyor comprising a plurality of augers disposed generally parallel to the mower, one of said augers rotatable on an axis ahead of the axis of pivot of the arms to the platform and the other of said augers having an axis behind said one auger whereby adjustment of the linkage changes the relative elevation of the augers for different crop conditions for changing the attitude of the swath as it is windrowed.

3. In a swather, a wheeled support, a platform, means pivoting the platform on the support for vertical movement between lowered and elevated positions, means mounting the platform from said first mentioned means for independent vertical movement at its ends, a mower along the forward edge of the platform, conveying means extending lengthwise of the mower for discharging crops cut by the mower into a windrow, said conveying means having portions forwardly and rearwardly of said second mentioned means and means for adjusting the position of the platform relative to the support and said first-mentioned means for changing the attitude of the swath as it is windrowed.

4. In a swather, a wheeled support, a platform, means pivotally supporting the platform about a first generally horizontal axis from the support, said platform having a mower along its front edge, conveying means on the platform extending along the mower for delivering crops lengthwise of the platform into a windrow, and means for changing the angular relation of the platform about a second generally horizontal axis spaced with respect to said first-mentioned means, for changing the relation of the conveying means and the mower relative to the wheeled support for varying the attitude of the swath as it is windrowed, for harvesting selected crops.

5. The invention according to claim 4 and said conveying means on the platform comprising a pair of augers extending lengthwise of the mower, one of said augers being between the mower and said second axis of pivot of the platform on the support and the other of said augers being located behind said second axis of pivot.

6. The invention according to claim 5 and the auger between said mower and said second axis of pivot of the platform having a different delivery rate than the other auger.

7. The invention according to claim 4 and said platform having a crop discharge opening intermediate its ends and said conveying means on the platform comprising a pair of augers at each end of the platform discharging into the opening, one of said augers of each pair being located between the mower and said second axis of pivot of the platform and the other of augers of each pair being behind said second axis.

8. The invention according to claim 4 and said conveying means comprising auger means on the platform, an adjustable connection between said platform and support for tilting the platform about said second axis of pivot for changing the relationship of the mower to the ground and the elevational position of said augers relative to each other for changing the attitude of discharge thereby of crops into a windrow.

9. The invention according to claim 8 and said auger means comprising augers of different diameter and rotating at different speeds.

10. The invention according to claim 8 and the auger means comprising an auger in front of said second axis and an auger behind the second axis and being of larger diameter than the auger in front of the axis.

11. The invention according to claim 10 and said augers behind the second axis having a delivery rate faster than the other auger.

References Cited
UNITED STATES PATENTS

| | | | |
|---|---|---|---|
| 2,513,111 | 6/1950 | Schiller | 56—23 |
| 3,151,429 | 10/1964 | Dyrdahl | 56—23 |
| 3,266,230 | 8/1966 | Rowbotham | 56—208 |

ABRAHAM G. STONE, *Primary Examiner.*

ANTONIO F. GUIDA, *Examiner.*

Dedication 3,363,407.—*William D. Drummond*, Burlington, Ontario, Canada. HARVESTER PLATFORM WITH LATERAL FLOAT AND ATTITUDE CONTROL MEANS. Patent dated Jan. 16, 1968. Dedication filed Jan. 24, 1973, by the assignee, *International Harvester Company*. Hereby dedicates said Letters Patent to the Public.

[*Official Gazette May 1, 1973.*]